March 21, 1939. F. E. SMITH 2,150,947
WASHING APPARATUS
Filed Jan. 23, 1937 3 Sheets-Sheet 1
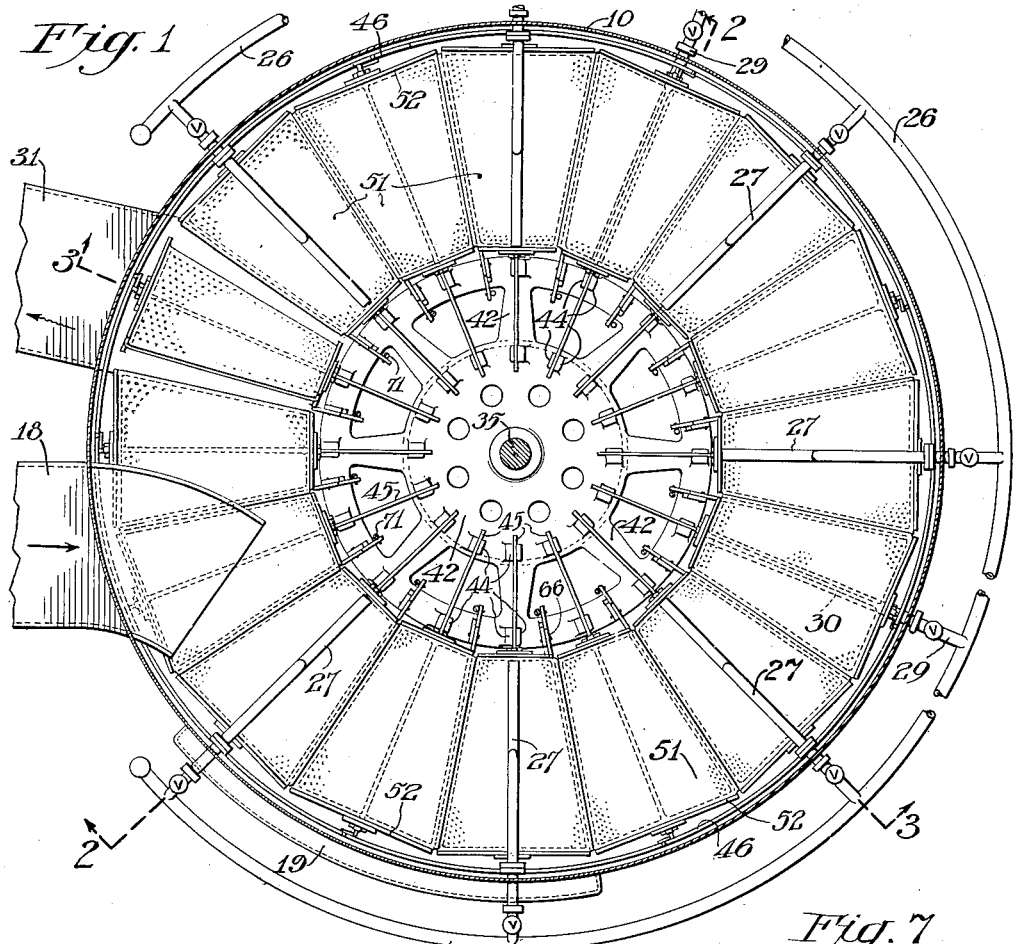
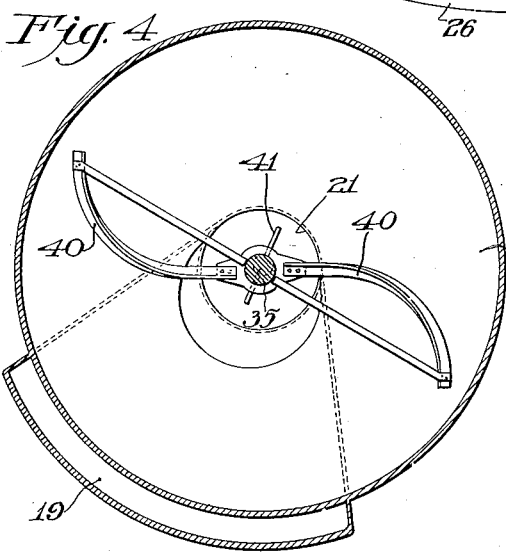
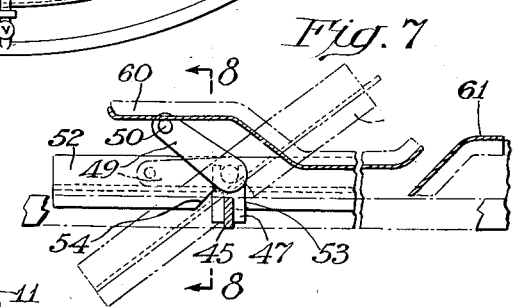
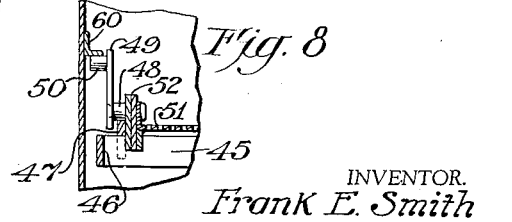
INVENTOR.
Frank E. Smith
BY John L. Seymour
ATTORNEY.

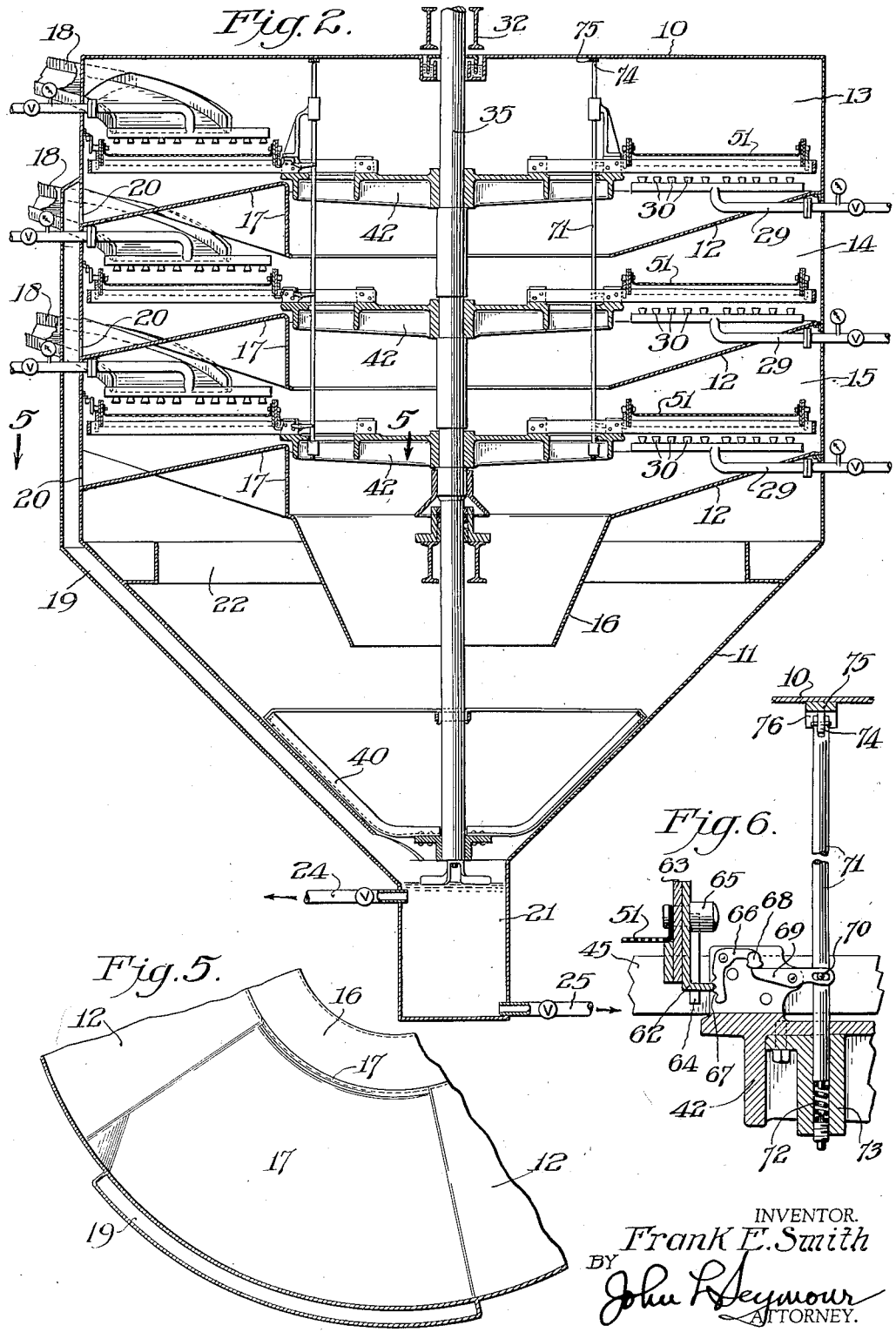

March 21, 1939.  F. E. SMITH  2,150,947
WASHING APPARATUS
Filed Jan. 23, 1937  3 Sheets-Sheet 3
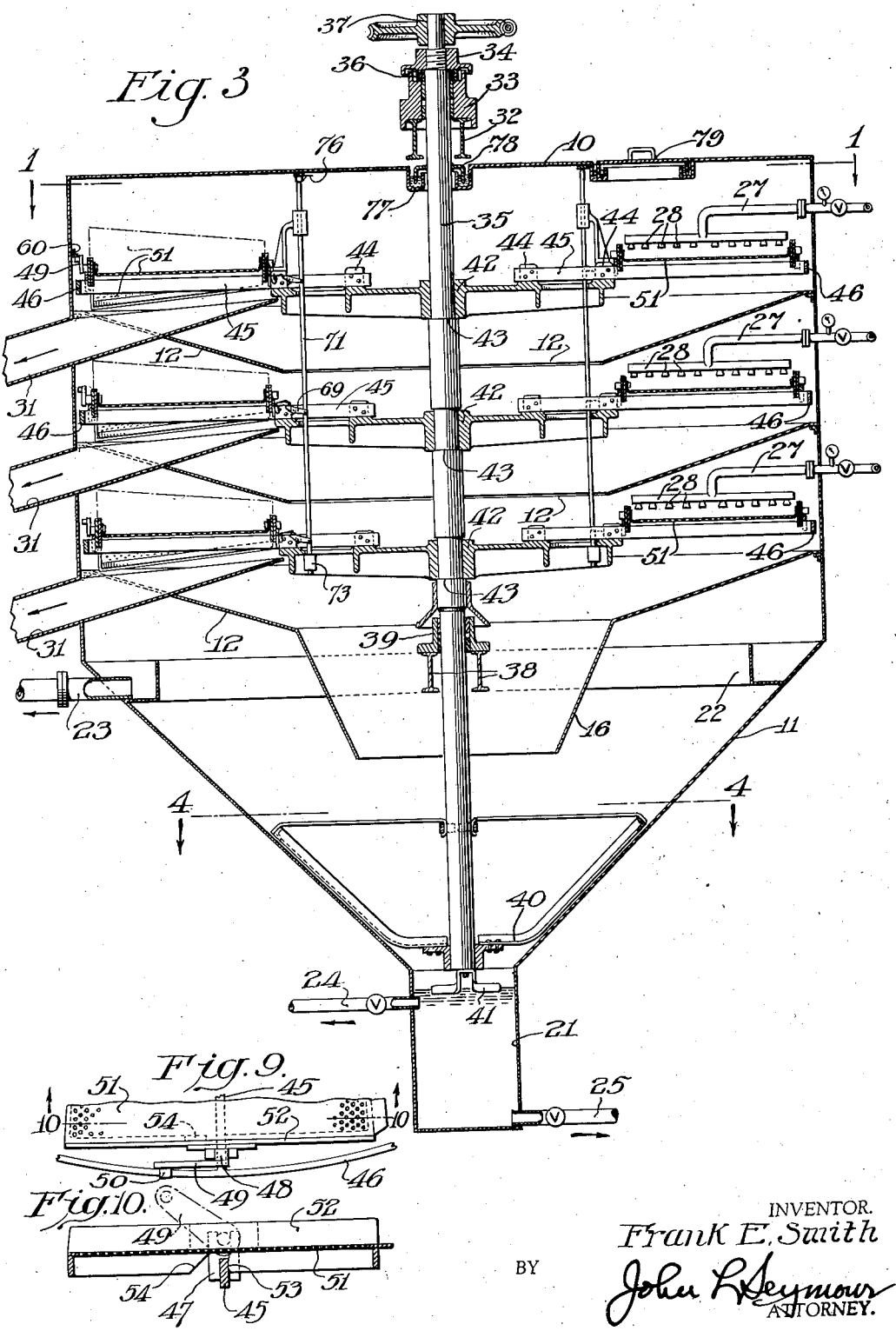
INVENTOR.
Frank E. Smith
BY John L. Seymour
ATTORNEY.

Patented Mar. 21, 1939

2,150,947

UNITED STATES PATENT OFFICE 2,150,947

WASHING APPARATUS

Frank E. Smith, Wilmington, Del., assignor to E. I. du Pont de Nemours & Company, Wilmington, Del., a corporation of Delaware Application January 23, 1937, Serial No. 121,991

5 Claims. (Cl. 209—271)

A. This invention refers to a rotary washer. The invention will be described as a three-level washer for the washing of coal, middlings, and slate, but it is to be understood that any number of levels can be used and any suitable material washed in it.

B. In the drawings Figure 1 is a plan view in section taken beneath the top of the tank; Figure 2 is a section on the line 2—2 of Figure 1; Figure 3 is a section on the line 3—3 of Figure 1; Figure 4 is a section on the line 4—4 of Figure 3; Figure 5 is a detail section on the line 5—5 of Figure 2; Figure 6 is a detail of the locking mechanism; Figure 7 is a detail of the dumping and leveling mechanism; Figures 8, 9, and 10 are detail views in longitudinal section, plan, and cross-section, respectively, of the operation of the pan mount and dumping mechanism.

C. In the drawings, 10 is a cylindrical tank having a conical bottom 11; 12—12 are partitions dividing the tank into vertical compartments of which the upper is 13, the middle 14, and the bottom 15; 16 is a skirt depending from the lowest partition. These partitions slope generally toward the center of the tank so that liquids will run to the center and into the conical bottom 11. 17 are upwardly off-set portions pressed into the pans 12 to deflect the first washings, which are heavily laden with parting liquid, into a channel 19 outside the main wall of the tank; 20 are openings in the wall of the tank connecting the channel 19 with the upwardly deflected portions 17 of the pans 12. By this construction liquid falling upon the section 17 is carried directly down the channel 19 to the cylindrical sump 21 of the tank; 22 is a circular weir within the tank; 23 is an outlet pipe communicating with the channel behind the weir; 24 is a discharge pipe through which heavy liquid mixed with silt can be withdrawn; 25 is a discharge pipe through which heavy liquid and any sunken material can be withdrawn; 26 are liquid supply pipes partly encircling the tank; 27 are feeder pipes connecting the supply pipe 26 with the sprays 28 which are above the pan; 29 are other feeder pipes connecting the pipes 26 with sprays 30 which are placed beneath the pans; 31 are discharge chutes; 32 are supports; 33 is a bearing carried by the support; 34 is a complementary bearing carried by standard 35 which projects from within the tank; 36 are anti-friction pieces between the screw member 34 and body member 33 of the bearing; 37 is the driving means comprising a screw and gear mounted on the end of standard 35; 38 are supports within the tank mounted in the sides of the tank; 39 is a bearing within which the shaft 35 is journaled; 40 are scraper blades attached to the shaft and operating in close proximity to the sides of the cone 11; 41 is an off-set stirring member affixed to the bottom of the shaft 35 operating within the sump 21; 42 are supports hub-mounted on shoulders 43 of the shaft 35; 44 are lugs on the hub 42; 45 is a bar mounted between the cooperating lugs 44 and affixed thereto and projecting outwardly to close to the tank wall; 46 are rings to which the radial bars 45 are attached; 47 is an H-shaped member straddling member 45 in which is journaled stud 48; 49 is a lever attached to stud 48; 50 is a stud projecting from the lever 49; 51 is a pan fixed to the stud 48 and comprising a rim 52 having an abutment 53 which makes contact with one side of bar 45 to prevent rotation (as shown in Figure 7) clockwise and being provided with abutment 54 angularly placed to permit pivoting about the bar for dumping and to serve as an abutment to prevent excessive tilting; 60 is a cam bar with which the stud 50 makes contact to dump the contents of the pan; 61 is a cam bar to restore the pan to position; 62 is a locking lug on the inner rim 63 of the pan; 65 is a stud which journals the pan in H-member 64; 66 is a bell crank, pivoted to a lug on member 42, and having ratchet teeth 67 which, in operative position, cooperate with lug 62 to lock the pan in level position; 68 is a heavy head on crank 66; 69 is a lever pivoted to member 45, making contact with head 68 and being operatively connected by a pin and slot 70 to post 71 which is mounted on a spring 72 in member 73 which is affixed to bar 45; 74 is a roller carried by post 71 making contact with track 75 having cam 76, said cam being located in proximity to the dumping position; 77 is an annular cup in the top of the tank 40 which may be filled with liquid; 78 is an inverted cup attached to the shaft, the lower edge being beneath the level of liquid in the cup forming a seal; 79 is a cover giving access to the tank and water seal in the same way.

D. The operation of the device is as follows: The pans are rotated by turning the shaft 35, the adjacent pans making one continuous annular perforated support onto which coal, or other solids, are placed through chutes 18. The sprays wash the material from above and from beneath, the inverted sprays penetrating the perforated bottoms of the pans. The rollers 74 follow the track 75. The material is thoroughly washed after slightly less than one revolution of the pan and the pan is dumped by the roller 50 making contact with bar 60 which depresses it and tilts the pan which dumps the load into outlet chute 31. After dumping the roller 50 strikes the cam bar 61 and the pan is relevelled. At the same time that the roller 50 strikes the bar 60 the roller 75 strikes the cam 76 which depresses it against the spring 72, swings the lever 69 upwardly which disengages the teeth 67 from the lug 62, freeing the pan and permitting it to be rotated by the lever 49. After the roller 50 has been raised to normal position by the bar 61, the roller 74 leaves the cam 76 and the weight of portion 68 of the bell crank returns the bell crank to locking position with lug 62.

E. The water with which the material is washed, together with the fine materials, liquids, and the like which are carried with it through the perforated pans, drain down the slopes of the partitions 12 to the center, pass through skirt 16 and into cone 11, or passing through the openings 20 and the channel 19 they reach the bottom of the sump. The liquid level is maintained by the weir 22. Rotation of scrapers 40 prevents the adhesion of solids to the sides of the cone and the rotation of members 41 keeps the matter in the sump sufficiently stirred to prevent solidification. From time to time the matter in the sump is withdrawn through pipes 24 and 25. The substantially clear liquid which floats to the top and passes over the weir is withdrawn through pipe 23 for reuse in the screens or for such other purposes as are advantageous.

F. This device has particular applicability to the washing of coal, middlings and slate after separation by means of a gravity liquid. It may be assumed that the coal will be admitted to chamber 13, the middlings to chamber 14, and the slate to chamber 15, in which chambers each will be subjected to washing operations with the liquid, for instance water, from the sprays. The material which makes its way into the sump and cone will be a mixture of water, of separating liquid, and of solids. Solids and relatively heavy liquids will be drawn off continuously or from time to time if appropriate, and treated for the recovery of valuable constituents.

G. Among the advantages of this invention are the provision of an apparatus adapted for the washing of solids of all types, the provision of means for positively locking the pivoted pans of washer screens during operation, and advantageous means for dumping and relevelling the pans. The apparatus is of simple construction and highly efficient operation.

H. As many apparently widely different embodiments of this invention may be made without departing from the spirit and scope thereof, it is to be understood that I do not limit myself to the specific embodiments thereof except as defined in the appended claims.

I claim:

1. In a washer a cylindrical tank having a conical bottom, vertically arranged partitions therein opening toward the center, a standard journaled in the tank, means to rotate the standard, radial supports mounted on the standard, perforated pans mounted on the radial supports for tipping on a radial axis, means to admit material to the pans, means to wash the material in the pans, means to tilt a pan comprising a lever thereon, a track to make contact with the lever to tilt the pans, a track to make contact with the lever to level the tilted pans, and means to lock the pans in position during filling and washing comprising a ratchet on the standard, a cooperating projection on the pan and means to operate the said locking means comprising a track and a spring pressed member riding thereon, operated thereby, and operatively connected to the said ratchet.

2. The process which comprises passing a stream of granular material along a path, subjecting the said material to a series of washings to remove adherent material, collecting the liquid used in each washing, and conducting the liquid from the first washing to the bottom of a body of liquid and conducting the liquid from the last washing to the top of the same body of liquid, whereby the solids of the first liquid may settle through a lesser distance.

3. The process which comprises passing discontinuous solids along a path, subjecting the said solids to a series of washings, separately collecting certain of the washings, and uniting the said separately collected washings in one body by conducting the more heavily laden washings to a lower level than the more lightly laden washings.

4. A washer apparatus comprising a tank having a sump portion, circularly arranged trays, means to turn the trays, means to deposit solids on the trays, means to unload the trays, a plurality of means extending along the path of travel of the trays to wash the trays with liquids, means extending from the trays to the bottom of the sump to direct the liquids first used for washing into the lower sump portion, means to direct the liquids later used for washing into the upper sump portion, means to drain the upper sump portion, and means to drain the lower sump portion.

5. A washer apparatus comprising a tank having a sump portion, circularly arranged trays, means to turn the trays, means to deposit solids on the trays, means to unload the trays, means along the path of the trays to successively wash the trays with liquids, means operatively connecting the trays with the bottom of the sump to collect the liquids first drained from the trays into the lower sump portion, and means operatively connecting the trays with the upper sump portion to direct the liquid later drained from the trays into the upper sump portion.

FRANK E. SMITH.